United States Patent
Handshaw et al.

(10) Patent No.: US 10,521,634 B2
(45) Date of Patent: Dec. 31, 2019

(54) SYSTEM AND METHOD FOR SWITCHING BETWEEN HANDS-FREE AND HANDHELD MODES OF OPERATION IN AN IMAGING READER

(71) Applicant: SYMBOL TECHNOLOGIES, LLC, Lincolnshire, IL (US)

(72) Inventors: Darran Michael Handshaw, Sound Beach, NY (US); Joseph S. Slowik, Bellport, NY (US); Eric Trongone, West Babylon, NY (US); Christopher P. Klicpera, Westbury, NY (US); Joseph J. DiVirgilio, Port Jefferson Station, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/801,073

(22) Filed: Nov. 1, 2017

(65) Prior Publication Data
US 2019/0130150 A1    May 2, 2019

(51) Int. Cl.
*G06K 7/10*    (2006.01)
*G06K 7/14*    (2006.01)

(52) U.S. Cl.
CPC ......... *G06K 7/10881* (2013.01); *G06K 7/109* (2013.01); *G06K 7/10722* (2013.01); *G06K 7/1413* (2013.01); *G06K 2007/10524* (2013.01)

(58) Field of Classification Search
CPC .................................................. G06K 7/10881
USPC ...................................................... 235/462.41
See application file for complete search history.

(56) References Cited

U.S. PATENT DOCUMENTS

| | | | |
|---|---|---|---|
| 2006/0274042 A1* | 12/2006 | Krah | G06F 3/03543 345/163 |
| 2008/0006698 A1* | 1/2008 | Kotlarsky | G06K 7/10722 235/462.42 |
| 2014/0156107 A1* | 6/2014 | Karasawa | G01C 21/3664 701/1 |
| 2016/0350563 A1* | 12/2016 | Ye | G06K 7/109 |

* cited by examiner

*Primary Examiner* — Toan C Ly
(74) *Attorney, Agent, or Firm* — Yuri Astvatsaturov (57) ABSTRACT

A method and apparatus for switching an optical imaging reader between a hands-free mode and a handheld mode using two or more tactile sensors, both of which are actuated by cutaneous contact in order to switch from the hands-free mode to the handheld mode, and which switches from the handheld mode to the hands-free mode if one of the tactile sensors is no longer actuated by cutaneous contact.

23 Claims, 8 Drawing Sheets

SYSTEM AND METHOD FOR SWITCHING BETWEEN HANDS-FREE AND HANDHELD MODES OF OPERATION IN AN IMAGING READER

BACKGROUND OF THE INVENTION

Imaging readers, such as barcode scanners, can switch between hands-free and handheld modes of operation. Typically, a spring-based switch in a base of the imaging reader detected if the imaging reader was set down on a surface or cradle (hands-free), or removed from the surface or cradle (handheld). This required electronics to be placed in the base of the imaging scanner, making it susceptible to liquid spills and dirt which interfered with the switch and/or other electronics. A single capacitive touch sensor would alleviate these problems by detecting when the optical read was being held, but this was susceptible to false positives such as the user brushing against the sensor, water (e.g., water bottles), laying the optical scanner on a metal table or other contact between the capacitive sensors and an object capable of holding an electrical charge.

Accordingly, there is a need for system and method for improved switching between hands-free and handheld modes of operation in an imaging reader.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure provides an apparatus that includes a housing, an imaging engine, a first tactile sensor, a second tactile sensor, and a controller. The housing has a window and a manually-activated switch. The imaging engine is operable in a first state and in a second state. The imaging engine is supported by the housing and includes a light-detecting sensor with a field of view extending through the window. The light-detecting sensor is adapted to capture either light reflected from a target and/or light emitted from the target. The first and second tactile sensors are supported by the housing and operatively coupled to the imaging engine. The controller is operatively coupled to the first tactile sensor, the second tactile sensor, and the imaging engine. The controller is adapted to enable the imaging engine without manually actuating the manually-activated switch in the first state. The controller is further adapted to enable the imaging engine by manually actuating the manually-activated switch in the second state. The controller is still further adapted to switch the imaging engine from the first state to the second state in response to actuation of both the first and second tactile sensors.

Another aspect of the present disclosure provides an apparatus that includes a housing, an imaging engine, a plurality of tactile sensors, and a controller. The housing has a scanning head with a window, a handle, and a manually-activated switch on the handle. The imaging engine is supported by the scanning head and includes a light-detecting sensor with a field of view extending through the window and adapted to capture either light reflected from a target and/or light emitted from the target. The plurality of tactile sensors are supported by the handle and operatively coupled to the imaging engine. Each of the tactile sensors is adapted to detect a change in a process variable. At least some of the tactile sensors are at least partially below the scanning head. The controller is operatively supported by the handle and operatively coupled to the plurality of tactile sensors and the imaging engine. The controller is adapted to switch the imaging engine from a first mode to a second mode in response to at least two of the tactile sensors detecting a change in the process variable.

Figure 1A:
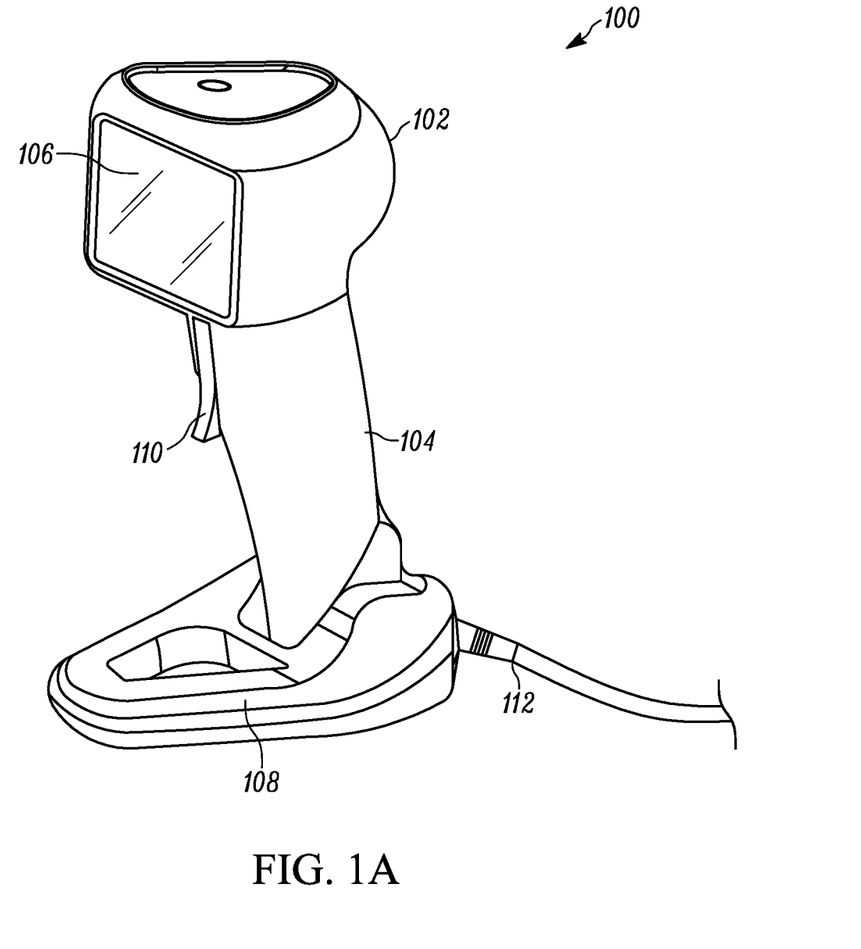
FIG. 1A is a perspective back and side view of an optical imaging reader in accordance with some embodiments.
Figure 1B:
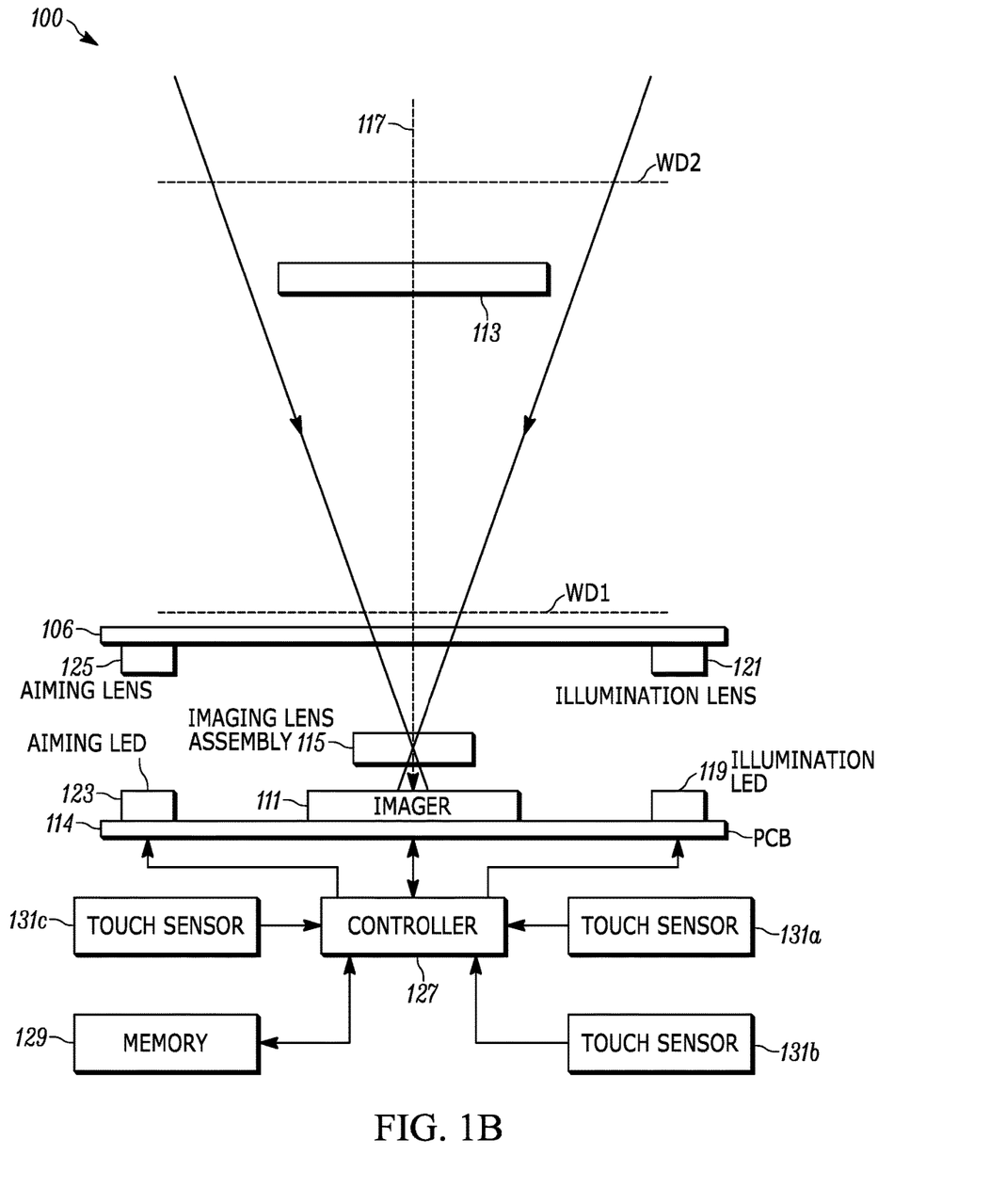
FIG. 1B is a schematic of various components of the reader of FIG. 1A.

FIGS. 1A and 1B are exemplary embodiments of an optical imaging reader 100 and the components thereof. FIG. 1A is a perspective, back and side view of an embodiment of an optical imaging reader 100. Generally speaking, the imaging reader has a scanning head or body 102 and a lower handle 104, and a window 106 located adjacent a front of the body 102. In one example, the reader 100 is ergonomically configured for a user's hand as a gun-shaped housing, though other configurations may be utilized as understood by those of ordinary skill in the art. In a further example, the lower handle 104 extends below and rearwardly away from the body 102.

In the embodiment of FIG. 1A, the reader 100 is connected to a base 108 that rests on a support surface, such as a countertop or tabletop. A cable 112 is connected to the base 108 to deliver electrical power to the reader 100 and to support bidirectional communications between the reader 100 and a remote host (not illustrated). However, in other embodiments, the reader 100 may be cordless and removable from a stand or presentation cradle that rests on the surface, in which case the reader 100 may have a battery to deliver electrical power and a wireless communication interface to facilitate bi-directional communications. In a further embodiment, a cable is connected to the stand to deliver electrical power to the reader 100 and recharge the battery when the reader 100 is placed in the stand.

For either reader embodiment, an imaging engine includes a light-detecting sensor or imager 111 operatively coupled to, or mounted on, a printed circuit board (PCB) 114 in the reader 100 as shown in FIG. 1B. In an embodiment, the imager 111 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imaging lens assembly 115 over a field of view along an imaging axis 117 through the window 106 in either mode of operation. The return light is scattered and/or reflected from the target 113 over the field of view. The imaging lens assembly 115 is operative for focusing the return light onto the array of image sensors to enable the target 113 to be read. The target 113 may be located anywhere in a working range of distances between a close-in working distance (WD1) and a far-out working distance (WD2). In a preferred embodiment, WD1 is about one-half inch from the window 106, and WD2 is about thirty inches from the window 106.

An illuminating light assembly is also mounted in the imaging reader 100. The illuminating light assembly includes an illumination light source, such as at least one light emitting diode (LED) 119 and at least one illumination lens 121, and preferably a plurality of illumination LEDs and illumination lenses, configured to generate a substantially uniform distributed illumination pattern of illumination light on and along the target 113 to be read by image capture. At least part of the scattered and/or reflected return light is derived from the illumination pattern of light on and along the target 113.

Figure 2A:
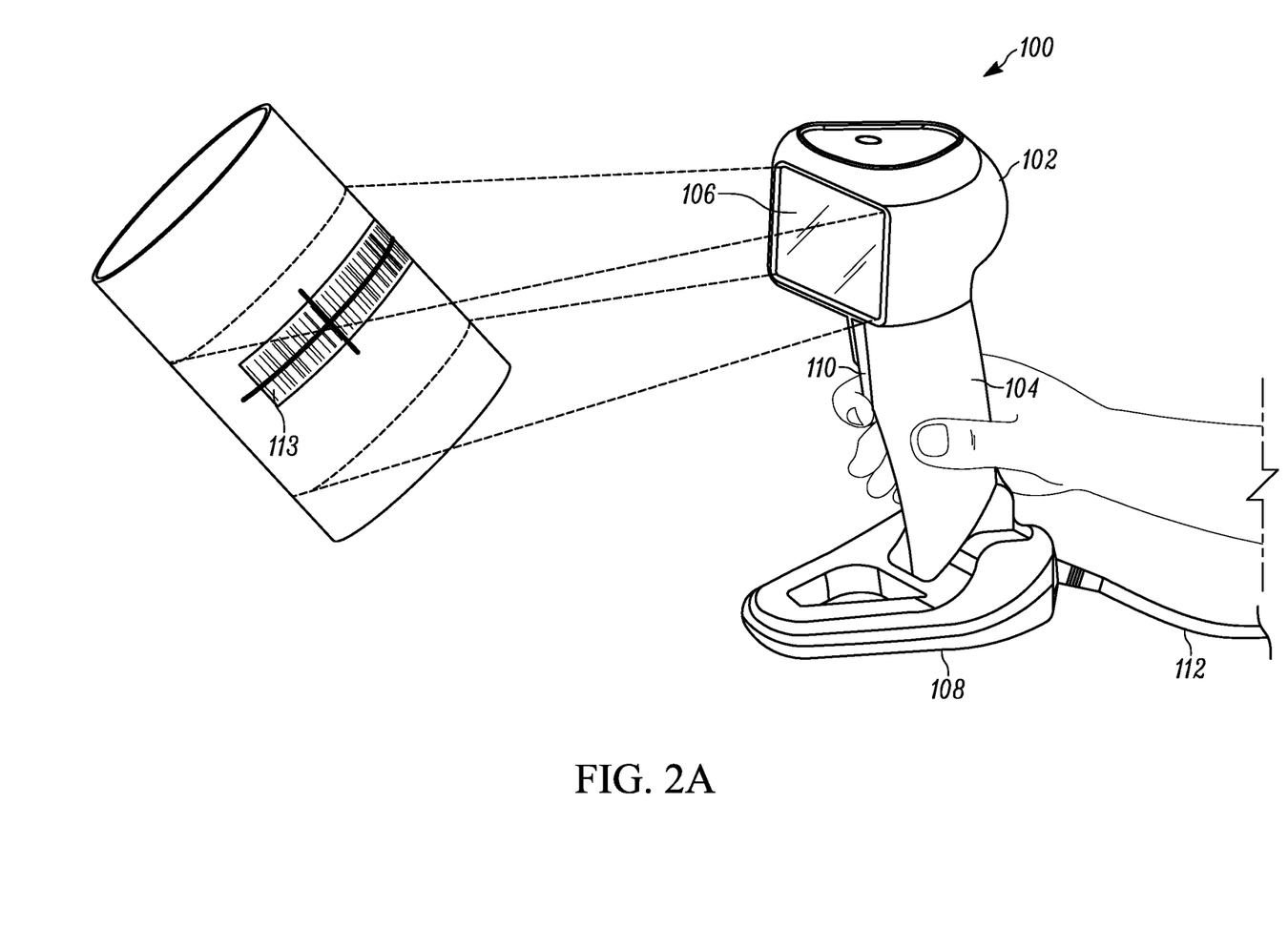
FIG. 2A is a perspective upper view of an optical imaging reader in a handheld mode in accordance with some embodiments.

An aiming light assembly is also mounted in the imaging reader 100 and preferably includes an aiming light source 123, e.g., one or more aiming LEDs, and an aiming lens 125 for generating and directing a visible aiming light beam away from the reader 100 onto the symbol 113 in the handheld mode. The aiming light beam has a cross-section with a pattern, for example, a generally circular spot or cross-hairs for placement at the center of the symbol 113 as shown in FIG. 2A, or a line for placement across the symbol 113, or a set of framing lines to bound the field of view, to assist an operator in visually locating the symbol 113 within the field of view prior to image capture.

As also shown in FIG. 1B, the imager 111, the illumination LED 119, and the aiming LED 123 are operatively connected to a controller or programmed microprocessor 127 operative for controlling the operation of these components. A memory 129 is connected and accessible to the controller 127. Preferably, the microprocessor 127 is the same as the one used for processing the captured return light from the illuminated target 113 to obtain data related to the target 113.

As further illustrated in FIG. 1A, touch sensors 131a-131c are mounted on the reader 100, preferably on the handle 104. The touch sensors 131a-131c are operative for detecting the handheld mode of operation in which the user holds the cordless reader 100, and manually activates a switch or trigger 110 during image capture, and for detecting the hands-free mode of operation in which the user does not hold the reader 100 and does not manually activate the trigger 110 during image capture. The controller 127 automatically switches from the triggerless, hands-free mode to the triggered, handheld mode when the touch sensors 131a-131c detect that the user is holding the reader 100, and preferably when the user is touching the handle 104. The triggerless, hands-free mode is the default mode.

Advantageously, one or more of the tactile or touch sensors 131a-131c are capacitive sensors for sensing user hand capacitance when the user's hand touches the housing of the handle 104. As used herein, "tactile sensor" or "touch sensor" refers to a sensor that detects touch, such as cutaneous touch, or near proximity without relying on physical contact on the surface of the sensor, a circuit is closed inside the sensor to create a flow of current. When the contact, or proximate contact, is released, the circuit is opened. Tactile sensors technologies may include, but are not limited to, capacitive, piezoresistive, elastoresistive, optical, magnetic, binary and piezoelectric transduction. However, a tactile sensor or touch sensor is not considered a mechanical input device that uses a mechanical device with moving parts.

A capacitive tactile sensor, in particular, measures variation of capacitance from an applied load over a parallel plate capacitor with a dielectric between the plates. The sensor electrode represents one of the plates of the capacitor and the other plate is represented by two objects: 1) the environment of the sensor electrode which formed parasitic capacitance, and 2) a conductive object like a human finger. The sensor electrode is electrically coupled to a measurement circuit and capacitance is periodically measured. The capacitance is directly proportional to the area of the sensor electrode and inversely proportional to the distance between the sensor electrode and the conductive object. The output capacitance from the sensor electrode will increase if a conductive object touches, or is in proximate contact with, a dielectric surface over the sensor electrode. The measurement circuit detects the change in the capacitance and converts it into a trigger signal. In one example, the controller 127 sends a cycle of signals to the sensor electrode in order to charge regions therein to a baseline voltage in incremental steps. When the dielectric is touched, the number of cycles to charge to the baseline voltage changes. The controller 127 detects this change, and detects the occurrence of a constant charge (e.g., 10 times in a row) to compare to the baseline voltage to verify an input to the capacitive sensor.

Although three tactile sensors 131a-131c are depicted in FIG. 1A, the reader 100 has at least two tactile sensors, making a third tactile sensor optional. For example, a single touch sensor, such as a single capacitive tactile sensor, senses the surrounding environment. If a conductive object other than, for example, the user's grip, is sensed by the capacitive tactile sensor, it will trigger a false activation of the handheld mode. Examples of relatively common conductive objects that trigger such a false activation include, but at not limited to, a metal support surface, water or a user simply brushing his/her hand against the sensor. Advantageously, having additional sensors in order to trigger the handheld mode significantly reduces the possibility of a false activation. The sensors may be strategically placed so as to be simultaneously triggered when a user grips the handle 104 as shown in FIG. 2A. In one example, disclosed further below, the handle 104 has a proximal end which connects to the scanning head 102, and the sensors may be supported by the housing at the proximal end below the scanning head 102 and at opposing sides on the handle 104. However, additional sensors may be positioned at various locations on the handle 104 where a user may grip the reader 100, including the trigger 110.

In a further embodiment, a noisy environment may trigger both of the sensors 131a and 131b thereby falsely activating the handheld mode, in which case the optional third tactile sensor 131c may be positioned on the reader in a location outside the user's normal grip. For example, if a user normally grips the handle 104 beneath the scanning head 102, the third tactile sensor 131c may be placed on the top and/or front of the scanning head 102, as this may be a location that the user is unlikely to grip along with the first and second tactile sensors 131a and 131b. A user gripping the reader 100 "correctly" would have cutaneous contact with the first and second tactile sensors 131a and 131b, but not the third tactile sensor 131c, such that the first and second tactile sensors 131a and 131b generates more signal than the third tactile sensor 131c. The reader 100 would then switch from a hands-free mode to a handheld mode if the first two tactile sensors 131a and 131b were triggered, but not the third tactile sensor 131c, even in a noisy environment. Triggering of the third tactile sensor 131c would switch the reader 100 back to the hands-free mode.

On the other hand, many manufacturers of tactile sensors have a timeout to establish a baseline, where the timeout removes the trigger state for the sensor and the baseline is recalibrated under the assumption that a foreign object is triggering the sensor. For example, if a capacitive tactile sensor senses a conductive element over a threshold period of time, the sensor's controller would deem it a false positive. In this case, a reader 100 activated in the handheld mode by a user gripping the handle 104 and triggering the sensors 131a and 131b would eventually revert to the hands-free mode as the user continues to hold the reader 100 for an indefinite amount of time. Accordingly, it is preferable to have the baseline trigger state (recalibration) of the sensors 131a and 131b removed, so that the sensors 131a and 131b can be triggered indefinitely.

Figure 2B:
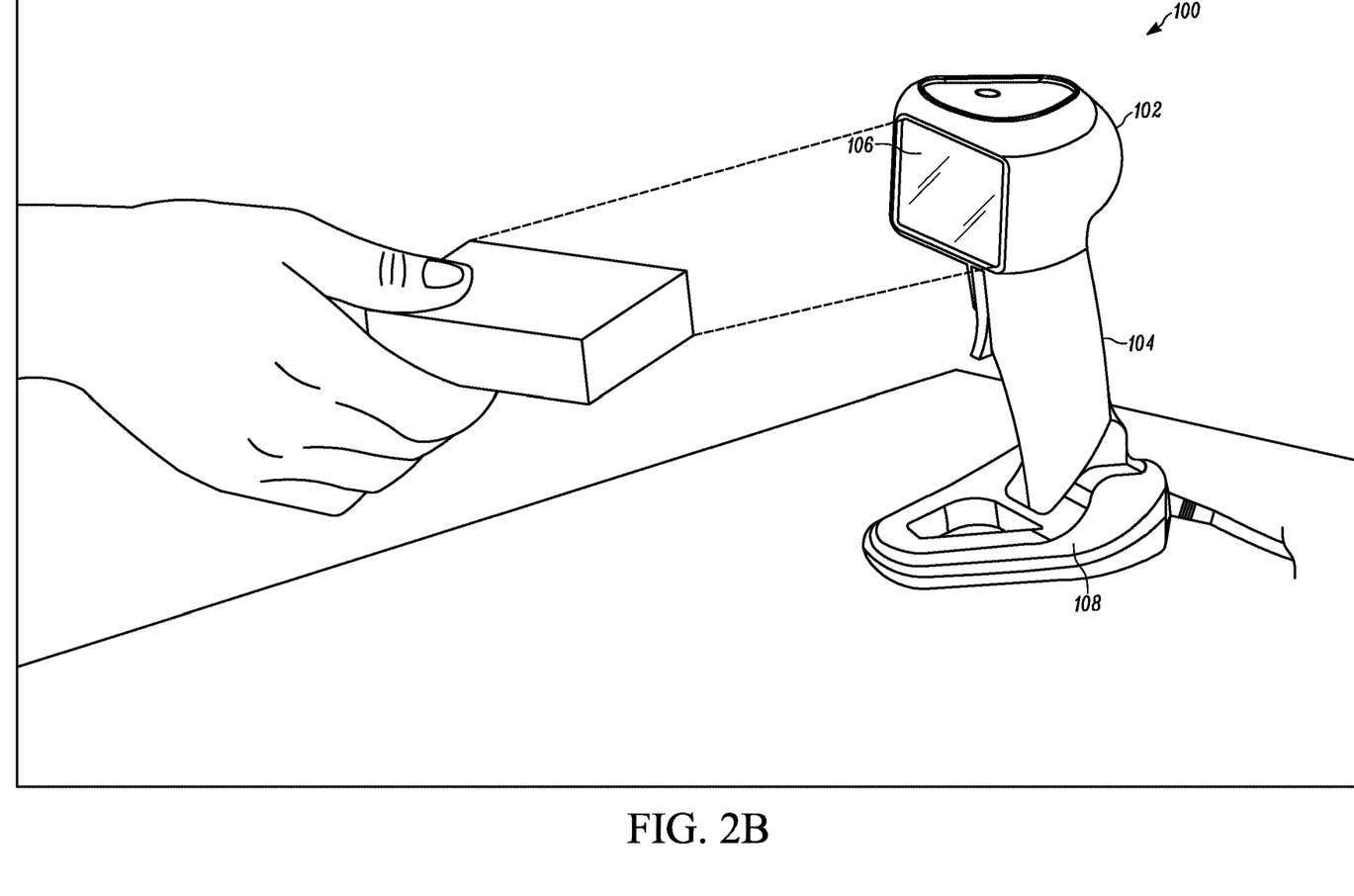
FIG. 2B is a perspective front view of an optical imaging reader in a hands-free (presentation) mode in accordance with some embodiments.

FIGS. 2A and 2B, respectively, are exemplary embodiments of a handheld and a hands-free modes of operation for the reader 100. As shown in FIG. 2A, the reader 100 of FIG. 1A, together with its stand 108, are jointly lifted as a unit off the support surface, and held by the handle 104 in an operator's hand, and used in a handheld mode of operation, in which the trigger 110 is manually actuated and depressed to initiate reading of symbol/document targets 113, such as a barcode on a product, in a range of working distances relative to the window 106. In a presentation or hands-free mode of operation, the reader 100 of FIGS. 1A and 1B, together with its base 108, is jointly mounted on the support surface, as shown in FIG. 2B, in which symbol/document targets are presented in a range of working distances relative to the window 106 for reading.

In a wireless embodiment, the stand 108 is a cradle that rests on the support surface, and the reader 100 is mounted in, or removed from, the cradle 108 depending on the mode of operation. In a handheld mode of operation, the reader 100 is removed and lifted from the cradle 108, and held by the handle 104 in an operator's hand, in which the trigger 110 is manually actuated and depressed to initiate reading of symbol/document targets in a range of working distances relative to the window 106. In a hands-free mode of operation the reader 100 is detachably mounted, and preferably tilted/oriented forward, in the cradle 108 in which symbol/document targets are presented in a range of working distances relative to the window 106 for reading, similar to FIG. 2B. A cable 112 may be connected to the cradle 108 to support bidirectional communications between the reader 100 mounted in the cradle 108 and a remote host (not illustrated). Alternatively or in addition, the cable 112 includes power conductors for supplying electrical power to recharge a battery in the wireless reader 100.

Figure 3A:
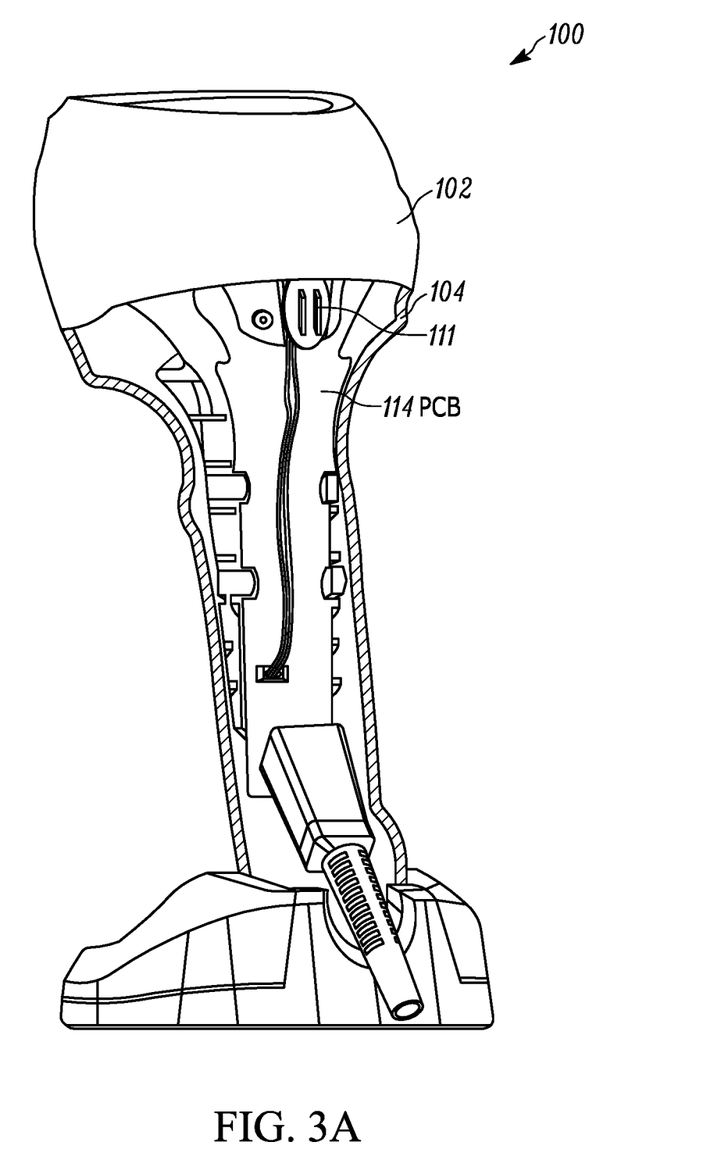
FIG. 3A is a cross-sectional back view of a portion of the interior of the optical imaging reader in accordance with some embodiments.
Figure 3B:
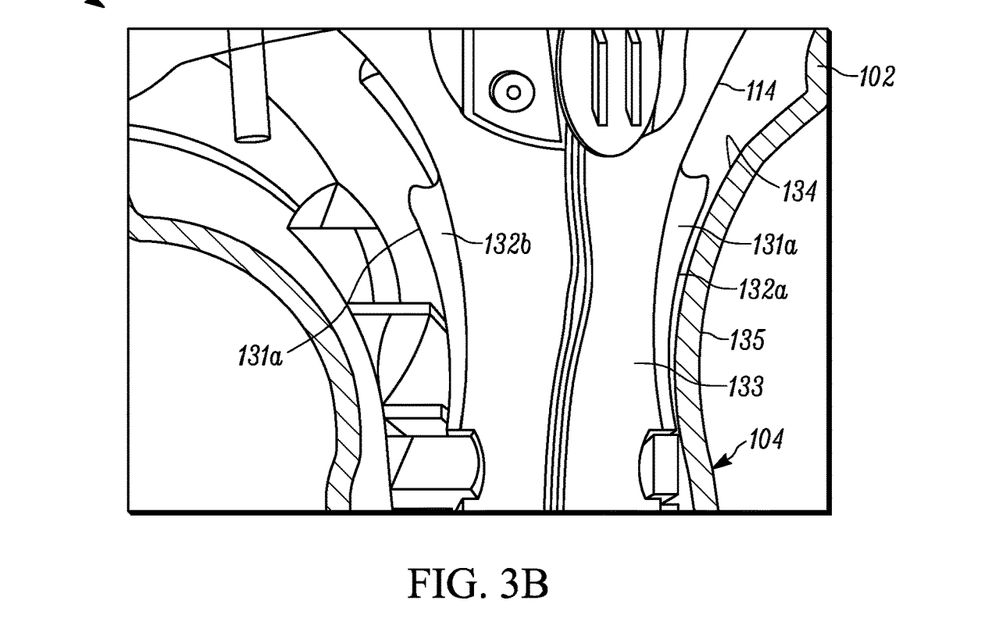
FIG. 3B is a cross-sectional back view of a portion of the interior of a handle of the optical imaging reader in accordance with FIG. 3A.

FIGS. 3A and 3B are cross-sectional views showing the interior of the handle 104 of the housing in an embodiment of the reader 100. Referring to FIG. 3A, the interior of the handle 104 houses, at least in part, the printed circuit board (PCB) 114, upon which may be mounted the imager 111 as it extends into the scanning head 102. At the very least, the PCB 114 is operatively coupled to the imager 111. Notably, in this embodiment the PCB 114 does not extend into the base 108, nor have any electronics extend into the base, as contrasted with prior readers that utilized a mechanical spring-based switch at the bottom of the base to switch between hands-free and handheld modes.

FIG. 3B depicts a cross-section of the interior of the housing where the proximal end of the handle 104 meets the underside of the scanning head 102 and where a user generally grips the reader 100 (or at least grips with the thumb, forefinger and purlicue). As seen more particularly in FIG. 3B, the PCB 114 includes tactile sensors 131a and 131b positioned on opposing wing portions 132a and 132b, respectively, extending parallel from the plane of a main body 133 of the PCB 114.

In an embodiment, the tactile sensors 131a and 131b are capacitive tactile sensors, and the wing portions 132a and 132b bring the tactile sensors 131a and 131b closer to the interior surface 134 of the housing of the handle 104 in order to increase the signal-to-noise ratio, preferably to a ratio of at least 5:1, which the applicant has deemed preferable as the minimal viable signal-to-noise ratio. In a particular example, the wing portions 132a and 132b bring the capacitive tactile sensors 131a and 131b to a distance of 4 millimeters from the interior surface 134 or less on either side of the housing, including adjacent the interior surface 134 of the housing. Of course, as noted above, the capacitance of a capacitive tactile sensor is directly proportional to the area of the sensor electrode and inversely proportional to the distance between the sensor electrode and the conductive object (e.g., cutaneous touch of the reader 100 by a user's hand). In such an embodiment, the housing may be constructed of a dielectric, such as polycarbonate, and have a wall thickness of 1.5 millimeters to 2.5 millimeters, which allows for the 5:1 signal-to-noise ratio with distance of 4 millimeters or less between the interior of the housing and each capacitive tactile sensor, while maintaining the integrity of the housing during use of the reader 100. Further, the sensing electrode of the capacitive tactile sensors may be copper embedded in the wings 132a and 132b of the PCB 114 itself, which the applicant has deemed preferable as an inexpensive, yet robust, material.

In another embodiment, one or more of the tactile sensors 131a and 131b are resistive tactile sensors, and the wing portions 132a and 132b bring the tactile sensors 131a and 131b adjacent or into the interior surface 134 of the housing of the handle or extend the tactile sensors 131a and 131b through the interior surface and adjacent an outer surface 135 of the housing, or even through the housing entirely, in order to create enough change of electrical resistance between a conductive polymer and at least two electrodes. In either embodiment, a third tactile sensor 131c is positioned on the scanning head 102, and preferably towards the front of the scanning head 102 (e.g., closer to the window 106), so as to not have cutaneous contact with a user's hand while in operation.

Figure 4A:
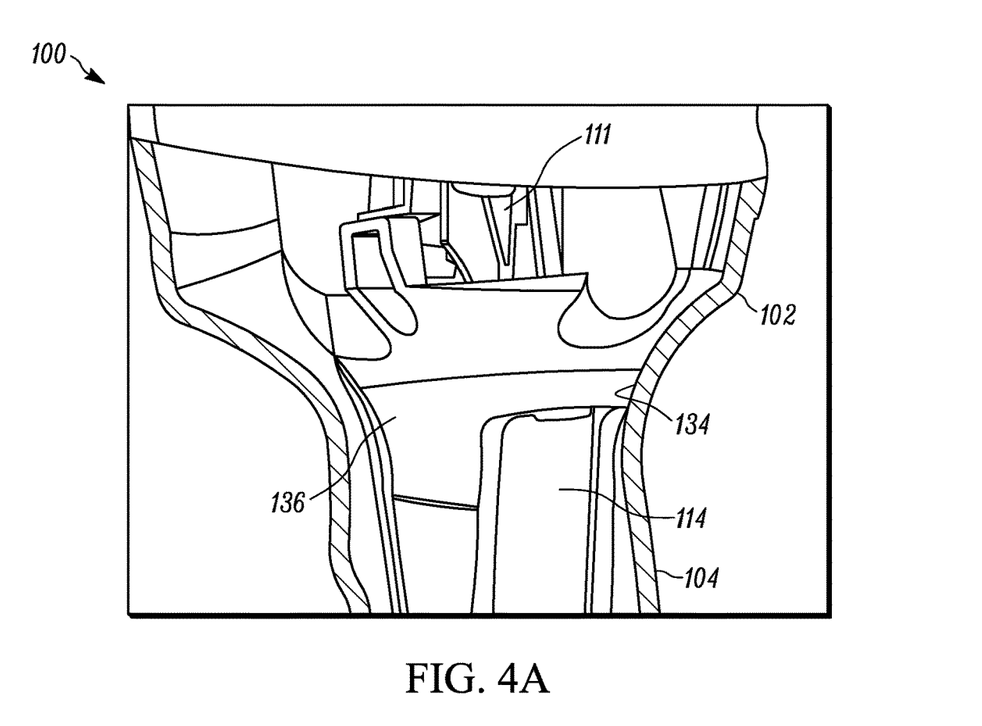
FIG. 4A is a cross-sectional perspective view of a portion of the interior of a handle of the optical imaging reader in accordance with other embodiments.
Figure 4B:
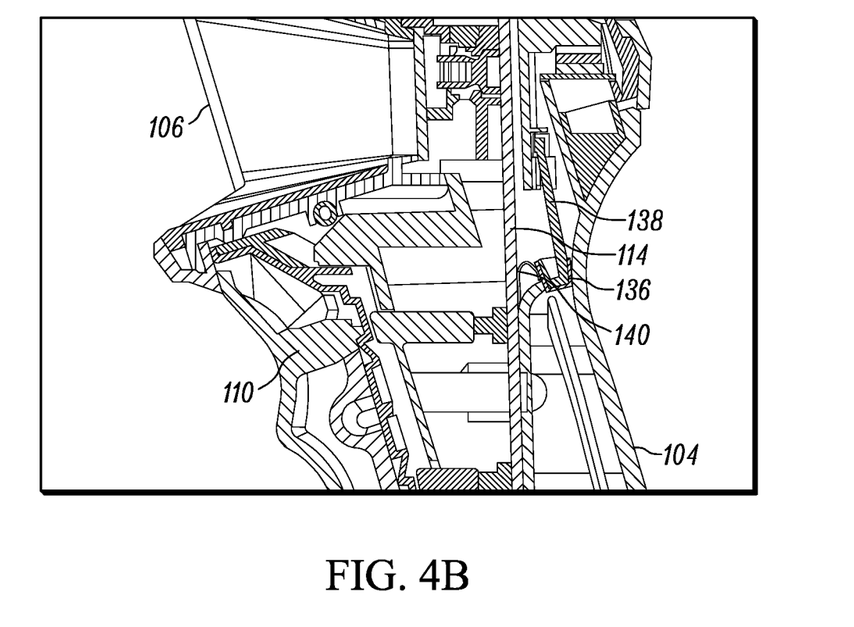
FIG. 4B is a cross-sectional side view of a portion of the interior of a handle of the optical imaging reader in accordance with FIG. 4A.

FIGS. 4A and 4B are cross-sectional views showing the interior of the handle 104 of the housing in a further embodiment of the reader 100. In this particular embodiment, a copper foil tape, copper sheet metal or other conductive material 136 wraps around an interior frame 138 adjacent the interior 134 of the housing, with the conductive material 136 between the interior frame 138 and the interior 134 of the housing. Spring contacts 140 on the surface of the PCB 114 connect with the conductive material 136 when the frame 138 is assembled to the PCB 114. In an embodiment, the conductive material 136 is brought right up against the inside curve of the handle 104 in order to optimize the signal-to-noise ratio.

In the hands-free mode of operation, the controller 127 may either be free-running and continuously or intermittently send a command signal to energize the illumination LED 119 for a short exposure time period, say 1080 microseconds or less, and energizes and exposes the imager 111 to collect the return light (e.g., illumination light, reflected light and/or ambient light) from the target 113 during said exposure time period. Alternatively, the imager 111 or an object sensor may be employed to detect entry of the target 113 into the field of view and, in response to such target entry detection, the controller 127 sends the aforementioned command signal. In the hands-free mode, the imaging engine is constantly attempting to read any target 113 placed within its field of view, and the illuminating light assembly 119, 121 is constantly being energized to illuminate any such target 113, and the controller 127 is constantly attempting to decode any such illuminated target 113.

Several characteristics of the imaging engine differ between the hands-free and handheld modes. For example, in the hands-free mode, the sensor gain and exposure settings of the imager 111 are typically lower than in the handheld mode, illumination intensity from the illumination LED 119 is typically lower than in the handheld mode when the switch 110 is activated, the imaging focal point is shorter (on variable focus designed readers) than in the handheld mode, a user feedback signal (e.g., light, sound effect, volume, etc.) is indicative of the hands-free mode and/or turns off upon decoding a target, with the handheld mode doing the inverse, a scene detect mode is activated to analyze a sampling of the imager 111 in order to detect an object passed in the field of view for the hands-free mode versus deactivating the scene detect mode, and/or the illumination LED 119 is automatically activated upon detection of an object passed in the field of view versus deactivating automatic activation in the handheld mode.

Alternatively or in addition, various other features can be altered between the hands-free mode and the handheld mode. For example, in the hands-free mode the aim intensity of the aiming LED 123 is lower or off as compared to the handheld mode. In another example, mechanical or magnetic retention mechanisms for retaining the reader 100 in place are activated for the hands-free mode and deactivated (or altered) for the handheld mode. In yet another example, the formatting or content of data transmitted to a remote host may vary depending on the mode (e.g., a different prefix or postfix, different communication format, etc.). In a further example, the virtual field of view within the image (i.e., the area of image that is actively processed) is wider in the hands-free mode than in the handheld mode. In still another example, the starting position within the image of the decode algorithm in the hands-free mode is left/right or random, and in the handheld mode the decode algorithm is centered. In still a further example, the laser scan angle on a laser designed reader is wider in the hands-free than for the handheld mode. In a yet further example, the power of the reader 100 is set higher for the hands-free mode than for the handheld mode until "woken up" upon touch.

In the handheld mode of operation, in response to actuation of the trigger 110, the controller 127 sends a command signal to energize the aiming LED 123, and to energize the illumination LED 119, for a short exposure time period, say 1080 microseconds or less, and energizes and exposes the imager 111 to collect the return light from the target 113 during said exposure time period. In the handheld mode, there is no constant attempt to illuminate, capture return light from, or process or decode, any target 113. In the handheld mode, most, if not all, of the components of the reader 100 are activated in response to actuation of the trigger 110.

Figure 5A:
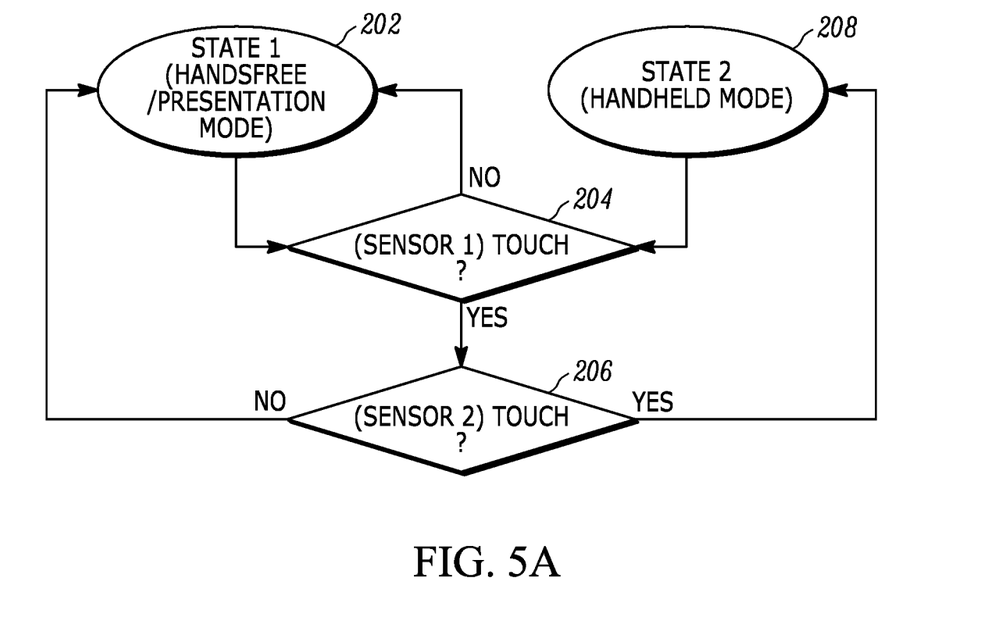
FIG. 5A is a flowchart of a method of controlling the optical imaging reader between a hands-free mode and a handheld mode in accordance with some embodiments.
Figure 5B:
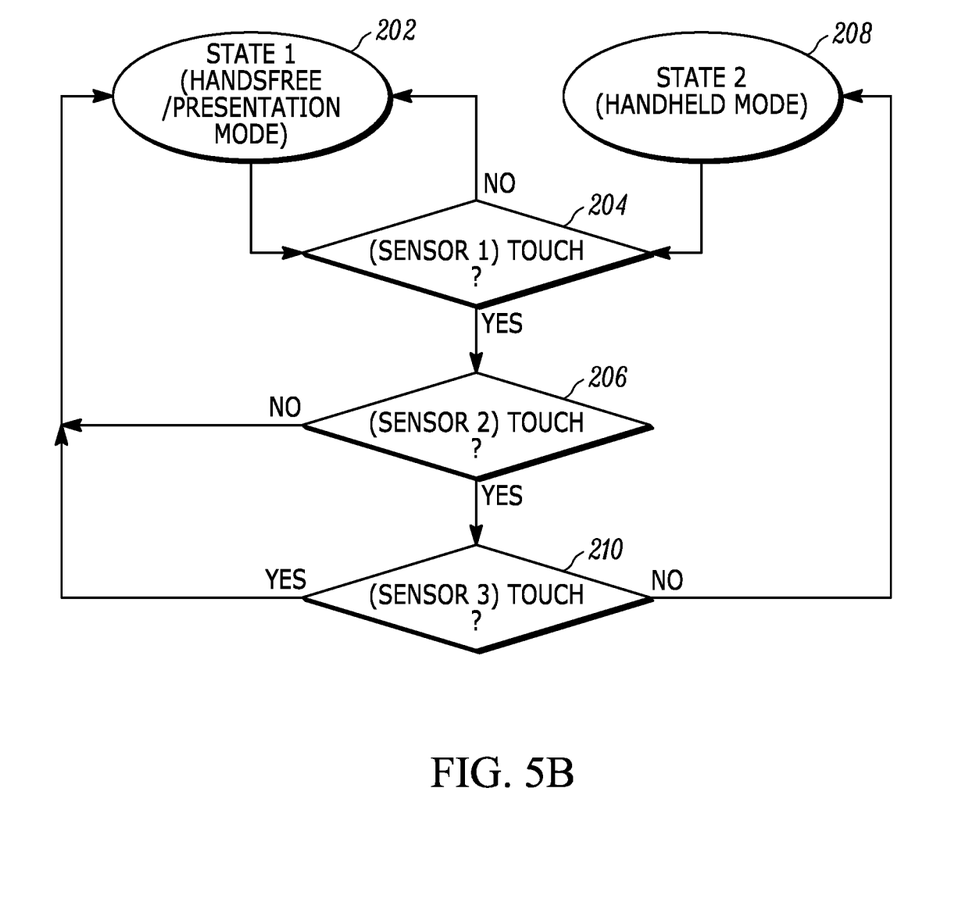
FIG. 5B is a flowchart of a method of controlling the optical imaging reader between a hands-free mode and a handheld mode in accordance with other embodiments.

FIGS. 5A and 5B are flowcharts of the control of the imaging engine between a first state (hands-free or presentation mode) and a second state (handheld mode) in two embodiments that have been described herein. Turning now to the flowchart of FIG. 5A, the imaging engine is in a first state 202 by default, which corresponds to a hands-free or presentation mode, in which the imaging engine is energized, the illuminating assembly is energized, and the controller 127 performs processing on the illuminated target 113, as described above. The controller 127 may continually monitors whether a first tactile sensor 131a has been actuated (i.e., measures a variation of capacitance from an applied conductive load, such as cutaneous contact with a user's hand) (block 204). If not, the imaging engine remains in the first state 202.

However, if the first tactile sensor 131a has been actuated, the controller 127 does not immediately switch to a second state. Instead, the controller 127 checks whether the second tactile sensor 131b has been actuated (block 206). Once both the tactile sensors 131a and 131b have been actuated, the controller 127 switches the imaging engine to the second state 208, which corresponds to a handheld mode in which the aiming LED 123 may be energized in response to trigger/switch 110 actuation, the imaging engine may be energized in response to trigger 110 actuation, the illuminating LED 119 may be energized in response to trigger 110 actuation, and/or the controller 127 performs processing on the illuminated target 113 in response to trigger 110 actuation, as described above. Thereafter, the controller 127 continually monitors whether both the first tactile sensor 131a and the second tactile sensor 131b remain actuated (i.e., both continue to measure an applied conductive load). If either the first tactile sensor 131a or the second tactile sensor 131b are no longer actuated (i.e., one or the other no longer measures an applied conductive load, such as a lack of cutaneous contact with a user's hand), the controller 127 switches to the first state 202. Thus, the chances of a false activation of the second state due to actuation of one tactile sensor by a conductive element (e.g., water, metal table, etc.) is minimized, because both tactile sensors must be actuated to switch to the second state, and if one of the tactile sensor is no longer actuated, the imaging engine switches back to the first state.

Turning now to the flowchart of FIG. 5B, like reference numerals refer to identical or functionally similar elements as in FIG. 5A. In this particular embodiment, control between the first and second states are additionally dependent upon a third tactile sensor 131c. For example, the imaging engine is again in a first state 202 by default, which corresponds to a hands-free or presentation mode. The controller 127 continually monitors whether a first tactile sensor 131a has been actuated (block 204). If not, the imaging engine remains in the first state 202. If the first tactile sensor 131a has been actuated, the controller 127 checks whether the second tactile sensor 131b has been actuated (block 206). However, rather than switch the imaging engine to the second state 208 at this point, the controller 127 checks whether the third tactile sensor 131c has been actuated (block 210). As described above, the third tactile sensor may be placed in a location that is unlikely to be touched by a user when the user holds the reader 100. As such, the third tactile sensor 131c is to remain un-actuated in order for the controller 127 to switch the imaging engine to the second state 208. Thus, in the currently described embodiment, only once both the tactile sensors 131a and 131b have been actuated, and the third tactile sensor 131c is not actuated, does the controller 127 switch the imaging engine to the second state 208. Thereafter, the controller 127 continually monitors whether both the first tactile sensor 131a and the second tactile sensor 131b remain actuated, and the third tactile sensor 131c remains not actuated. If either the first tactile sensor 131a or the second tactile sensor 131b are no longer actuated, or the third tactile sensor 131c is actuated, the controller 127 switches to the first state 202.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An apparatus comprising:
   a housing having a grip region configured to be gripped by a hand of a user, the housing further having a window and a manually-activated switch;
   an imaging engine operable in a first state and a second state, the imaging engine supported by the housing and including a light-detecting sensor with a field of view extending through the window and adapted to capture at least one of: light reflected from a target and light emitted from the target;
   a first tactile sensor supported by the housing and positioned proximate the grip region, the first tactile sensor being operatively coupled to the imaging engine;
   a second tactile sensor supported by the housing and positioned proximate the grip region, the second tactile sensor being operatively coupled to the imaging engine;
   a third tactile sensor supported by the housing and positioned away from the grip region, the third tactile sensor being operatively coupled to the imaging engine; and
   a controller operatively coupled to the first tactile sensor, the second tactile sensor, the third tactile sensor, and the imaging engine, the controller adapted to enable the imaging engine without manually actuating the manually-activated switch in the first state and to enable the imaging engine by manually actuating the manually-activated switch in the second state, the controller further adapted to switch the imaging engine from the first state to the second state in response to actuation of both the first and second tactile sensors, the controller also further adapted to actuate the imaging engine in the second state in response to actuation of both the first and second tactile sensors and no actuation of the third tactile sensor, and to actuate the imaging engine in the first state in response to actuation of the third tactile sensor.

2. The apparatus of claim 1, wherein at least one of the first and second tactile sensors comprises a capacitive sensor adapted to actuate in response to detecting capacitance, and wherein the controller is adapted to switch the imaging engine from the first state to the second state in response to cutaneous contact between one of: the user and the capacitive sensor, and the user and a portion of the housing positioned over the capacitive sensor.

3. The apparatus of claim 2, wherein the controller is adapted to maintain the second state in response to continuous cutaneous touch between the user and one of: 1) both the first and second tactile sensors, and 2) a portion of the housing positioned over the first tactile sensor and a portion of the housing positioned over the second tactile sensor.

4. The apparatus of claim 3, wherein the controller is adapted to switch the imaging engine from the second state to the first state in response to a lack of cutaneous touch between the user and one of: 1) the first tactile sensor and/or the second tactile sensor, and 2) the portion of the housing positioned over the first tactile sensor and/or the portion of the housing positioned over the second tactile sensor.

5. The apparatus of claim 1, wherein at least one of the first and second tactile sensors comprises a resistive sensor, and wherein the controller is adapted to switch the imaging engine from the first state to the second state in response to pressure applied to both the first and second tactile sensors.

6. The apparatus of claim 1, wherein the imaging engine further includes an illumination system adapted to emit light to the target through the window, and wherein the controller is adapted to control the imaging engine in the second state to increase the brightness of the light emitted by the illumination system when the manual switch is actuated as compared to the brightness of the light emitted by the illumination system in the first state.

7. The apparatus of claim 1, wherein the imaging engine further includes an illumination system adapted to emit light to the target through the window, and wherein the controller is adapted to:
   control the imaging engine in the first state to have one or more of: a first gain and exposure setting of the light-detecting sensor, a first illumination intensity of the emitted light, a first imaging focal point, a first user feedback signal, activation of a sample of the light-detecting sensor to detect an object, and automatic activation of the illumination system in response to detection of an object by the light-detecting sensor, and
   control the imaging engine in the second state to have one or more of: a second gain and exposure setting of the light-detecting sensor, a second illumination intensity of the emitted light, a second imaging focal point, a second user feedback signal, deactivation of the sample of the light-detecting sensor to detect an object, and deactivation of the illumination system in response to detection of an object by the light-detecting sensor.

8. The apparatus of claim 1, wherein the controller comprises a circuit substrate supported within the housing, the circuit substrate comprising a main body portion and wing portions extending from opposite sides of the main body portion towards the interior of the housing, the first tactile sensor positioned on a first wing portion and the second tactile sensor position on a second wing portion.

9. The apparatus of claim 1, wherein the first and second tactile sensors are supported by the housing so as to have a signal to noise ratio of at least 5:1 with cutaneous contact between one of: the user and the first and second tactile sensors, and the user and portions of the housing positioned over the first and second tactile sensors.

10. The apparatus of claim 1, wherein the housing comprises a wall thickness ranging between 1.5 millimeters and 2.5 millimeters, and the first and second tactile sensors are positioned within the housing ranging between 4 millimeters from the interior surface of the housing wall to adjacent the interior surface of the housing wall.

11. The apparatus of claim 1, wherein the housing comprises an interior frame having a portion adjacent an interior wall of the housing, and wherein the first and second tactile sensors each comprise a conductive material on the portion adjacent the interior wall between the interior frame between the interior frame and the interior wall of the housing.

12. An apparatus comprising:
   a housing having a scanning head with a window, a handle, and a manually-activated switch on the handle, the housing further having a grip region configured to be gripped by a hand of a user;
   an imaging engine supported by the scanning head and comprising a light-detecting sensor with a field of view extending through the window and adapted to capture at least one of: light reflected from a target and light emitted from the target;
   a plurality of tactile sensors supported by the handle and operatively coupled to the imaging engine, each of the plurality of tactile sensors adapted to detect a change in a process variable, wherein at least some of the plurality of tactile sensors are at least partially below the scanning head; and a controller operatively supported by the handle and operatively coupled to the plurality of tactile sensors and the imaging engine, the controller adapted to switch the imaging engine from a first mode to a second mode in response to at least two of the plurality of tactile sensors detecting a change in the process variable, the controller further adapted to actuate the imaging engine in the second mode in response to actuation of at least two of the plurality of tactile sensors and no actuation of at least one of the plurality of tactile sensor, and to actuate the imaging engine in the first mode in response to actuation of the at least two of the plurality of tactile sensors and the at least one of the plurality of tactile sensor, wherein the at least two of the plurality of tactile sensors are located proximate the grip region, and wherein the at least one of the plurality of tactile sensor is located away from the grip region.

13. The apparatus of claim 12, wherein the handle comprises a distal end and a proximal end connected to the scanning head, and wherein the at least two tactile sensors are supported by the handle at the proximal end.

14. The apparatus of claim 12, wherein the at least two tactile sensors each comprise a capacitive sensor adapted to actuate in response to detecting a capacitance, and wherein the controller is adapted to switch the imaging engine from the first mode to the second mode in response to cutaneous contact between one of: the user and the at least two tactile sensors, and the user and portions of the housing positioned over the at least two tactile sensors.

15. The apparatus of claim 14, wherein the controller is adapted to switch the imaging engine from the second mode to the first mode in response to a lack of cutaneous contact between the user and one of: 1) at least one of the at least two tactile sensors, and 2) a portion of the housing positioned over at least one of the at least two tactile sensors.

16. The apparatus of claim 14, wherein the controller is adapted to maintain the second mode in response to continuous cutaneous touch between the user and one of: the at least two tactile sensors, and portions of the housing positioned over the at least two tactile sensors.

17. The apparatus of claim 12, wherein the at least two tactile sensors each comprise a resistive sensor adapted to actuated in response to detecting a pressure, and wherein the controller is adapted to switch the imaging engine from the first mode to the second mode in response to pressure from the user on the at least two tactile sensors.

18. The apparatus of claim 12, wherein the controller is adapted to control the imaging engine in the second mode to increase the brightness of the light emitted by the illumination system when the manual switch is actuated as compared to the brightness of the light emitted by the illumination system in the first mode.

19. The apparatus of claim 12, wherein the controller is adapted to control the imaging engine in the first mode to having a first minimum working distance and to control the imaging engine in the second mode to have a second maximum working distance.

20. The apparatus of claim 12, wherein the imaging engine further includes an illumination system adapted to emit light to the target through the window, and wherein the controller is adapted to: enable the imaging engine in the first mode to emit light with a first characteristic without manually actuating the switch, enable the imaging engine in the second mode to emit light with the first characteristic in response to manually actuating the switch, and enable the imaging engine in the second mode to emit light with a second characteristic in response to not manually actuating the switch.

21. The apparatus of claim 12, wherein the first mode comprises a presentation mode in which a user does not hold the handle, and the second mode comprises a handheld mode in which the user holds the handle.

22. The apparatus of claim 12, wherein the controller comprises a circuit substrate supported within the handle, the circuit substrate comprising a main body portion and wing portions extending from opposite sides of the main body portion towards the interior of the housing, a first tactile sensor positioned on a first wing portion and a second tactile sensor position on a second wing portion.

23. The apparatus of claim 12, wherein the handle comprises an interior frame having a portion adjacent an interior wall of the handle, and wherein the first and second tactile sensors each comprise a conductive material on the portion adjacent the interior wall between the interior frame between the interior frame and the interior wall of the handle.

* * * * *